(12) United States Patent
Abu-Qahouq

(10) Patent No.: US 9,318,921 B2
(45) Date of Patent: Apr. 19, 2016

(54) SYSTEM AND METHOD FOR THREE MODE WIRELESS ENERGY HARVESTING

(75) Inventor: Jaber Abu-Qahouq, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 1220 days.

(21) Appl. No.: 13/063,015

(22) PCT Filed: Sep. 10, 2009

(86) PCT No.: PCT/US2009/056497
§ 371 (c)(1),
(2), (4) Date: May 24, 2011

(87) PCT Pub. No.: WO2010/030767
PCT Pub. Date: Mar. 18, 2010

(65) Prior Publication Data
US 2011/0218014 A1    Sep. 8, 2011

Related U.S. Application Data

(60) Provisional application No. 61/096,052, filed on Sep. 11, 2008.

(51) Int. Cl.
*G05F 3/06* (2006.01)
*H02J 17/00* (2006.01)

(52) U.S. Cl.
CPC ..................... *H02J 17/00* (2013.01)

(58) Field of Classification Search
None
See application file for complete search history.

(56) References Cited

U.S. PATENT DOCUMENTS

| | | | |
|---|---|---|---|
| 8,487,481 B2 * | 7/2013 | Cook et al. | 307/104 |
| 2002/0090974 A1 * | 7/2002 | Hagn | 455/552 |
| 2007/0149138 A1 * | 6/2007 | Das | 455/68 |
| 2009/0108679 A1 * | 4/2009 | Porwal | 307/104 |
| 2009/0312046 A1 * | 12/2009 | Clevenger et al. | 455/522 |

* cited by examiner

*Primary Examiner* — Jared Fureman
*Assistant Examiner* — Aqeel Bukhari
(74) *Attorney, Agent, or Firm* — Meunier Carlin & Curfman LLC

(57) ABSTRACT

Described herein are embodiments of methods and systems for a three mode wireless energy harvesting concept wherein a triceiver system with a single antenna can be configured to transmit wireless data, receive wireless data and exchange power with other devices. When not being used for exchanging power, the triceiver system with the single antenna can be operably connected to data transfer functions of a wireless device. When used for receiving power, the triceiver antenna can be operably connected to subsystems for converting RF signals to electrical energy. When used for transmitting power, the triceiver antenna can be operably connected to subsystems for converting electrical energy to RF signals.

20 Claims, 7 Drawing Sheets

SYSTEM AND METHOD FOR THREE MODE WIRELESS ENERGY HARVESTING

CROSS-REFERENCE TO RELATED APPLICATION

This application claims benefit of and priority to U.S. Provisional Patent Application No. 61/096,052 filed Sep. 11, 2008, which is fully incorporated herein by reference and made a part hereof.

BACKGROUND

Mobile communication platforms may face a challenge that is related to energy consumption and battery life. Mobile platform users demand more functionalities and wireless connectivity in smaller size and weight devices. These functionalities generally require more power and increased energy capacity.

Platforms with wireless connectivity have an energy source that has not been sufficiently studied, utilized, or made practical for use. This energy source is the wireless connectivity energy itself which can include the wireless receiver and transmitter in a mobile platform, wireless access points (which are becoming more and more available in more locations, indoors and outdoors) and other wireless signals available in the surrounding atmosphere.

Therefore, what is needed are methods and system for utilizing the RF energy transmitted by wireless devices to power mobile platforms.

SUMMARY

In embodiments described herein, systems and methods are provided for harvesting and utilizing wireless connectivity energy for platforms with wireless connectivity. In one embodiment, the methods and systems enable the transmission of power to wireless devices using wireless connectivity energy.

Additional advantages will be set forth in part in the description which follows, or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention and like reference characters used therein indicate like parts throughout the several drawings.

DETAILED DESCRIPTION

Figure 1A:
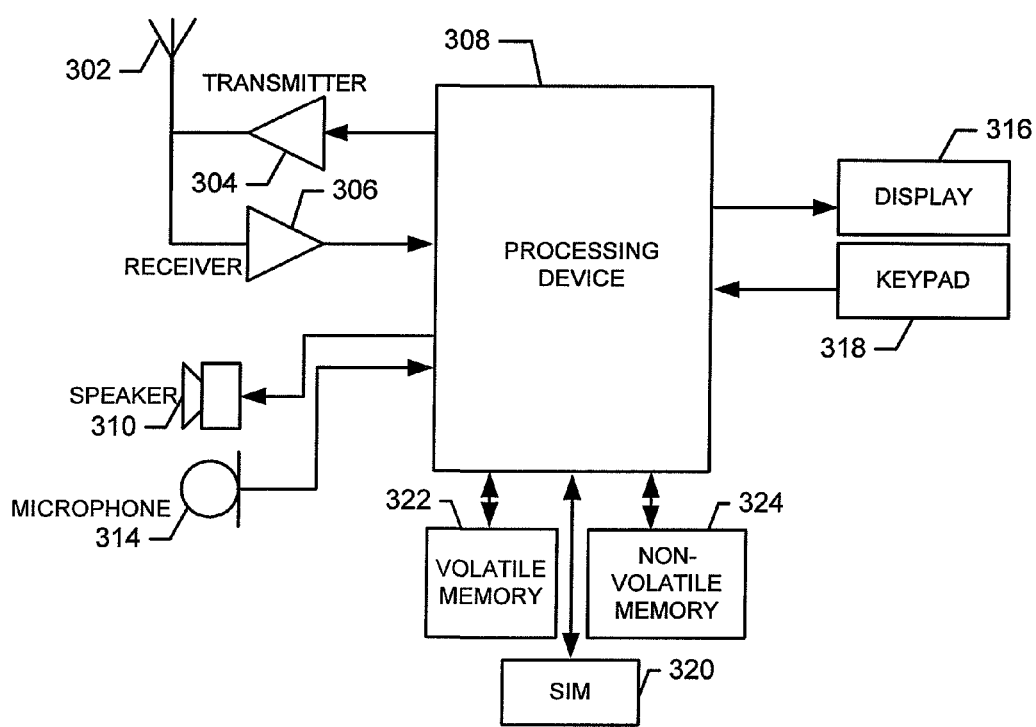
FIG. 1A illustrates one type of electronic device that would benefit from embodiments of the present invention.

The present embodiments may be understood more readily by reference to the following detailed description of the embodiments and the examples included therein and to the figures and their previous and following description.

Before the present systems, articles, devices, and/or methods are disclosed and described, it is to be understood that this description is not limited to specific systems, specific devices, or to particular methodology, as such may, of course, vary. It is also to be understood that the terminology used herein is for the purpose of describing particular embodiments only and is not intended to be limiting.

The following description is provided as an enabling teaching of the system and method in its best, currently known embodiment. To this end, those skilled in the relevant art will recognize and appreciate that many changes can be made to the various aspects of the systems and methods described herein, while still obtaining the beneficial results of the present systems and methods. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that throughout the application, data is provided in a number of different formats and that this data represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

"Optional" or "optionally" means that the subsequently described event or circumstance may or may not occur, and that the description includes instances where said event or circumstance occurs and instances where it does not.

"Exemplary," where used herein, means "an example of" and is not intended to convey a preferred or ideal embodiment. Further, the phrase "such as" as used herein is not intended to be restrictive in any sense, but is merely explanatory and is used to indicate that the recited items are just examples of what is covered by that provision.

As will be appreciated by one skilled in the art, embodiments described herein can take the form of a method, a data processing system, or a computer program product. Accordingly, embodiments may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, optical storage devices, or magnetic storage devices.

Embodiments of the present invention are described below with reference to block diagrams and flowchart illustrations of methods, systems, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1A illustrates one type of electronic device that would benefit from embodiments of the present invention. As shown, the electronic device may be a mobile station 10, and, in particular, a cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

Figure 1B:
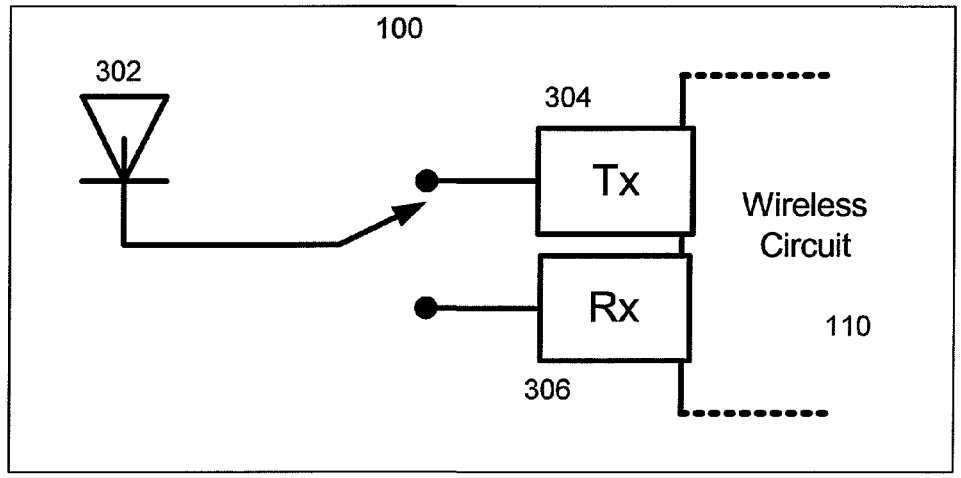
FIG. 1B illustrates a simplified, non-limiting block diagram showing select components of a wireless communication device.

The mobile station 10 includes various means for performing one or more functions in accordance with embodiments of the present invention, including those more particularly shown and described herein. It should be understood, however, that the mobile station may include alternative means for performing one or more like functions, without departing from the spirit and scope of the present invention. More particularly, for example, as shown in FIG. 1A, in addition to an antenna 302, the mobile station 10 includes a transmitter 304, a receiver 306, and an apparatus that includes means, such as a processor 308, controller or the like, that provides signals to and receives signals from the transmitter 304 and receiver 306, respectively, and that performs the various other functions described herein. FIG. 1B shows a typical block diagram of a transceiver 100 in a mobile device 10. The transceiver 100 utilizes the antenna 302 in a multiplexing fashion to receive 304 and transmit 306 data. As discussed in more detail below, the processor 308 may be configured to perform wireless energy harvesting and transmitting operations in cooperation with the transceiver 100.

As one of ordinary skill in the art would recognize, the signals provided to and received from the transmitter 304 and receiver 306, respectively, may include signaling information in accordance with the air interface standard of the applicable cellular system and also user speech and/or user generated data. In this regard, the mobile station 10 can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processor 308, controller or other computing device, may include the circuitry required for implementing the video, audio, and logic functions of the mobile station and may be capable of executing application programs for implementing the functionality discussed herein. For example, the processor may be comprised of various means including a digital signal processor device, a microprocessor device, and various analog to digital converters, digital to analog converters, and other support circuits.

The control and signal processing functions of the mobile device are allocated between these devices according to their respective capabilities. The processor 308 thus also includes the functionality to convolutionally encode and interleave message and data prior to modulation and transmission. The processor can additionally include an internal voice coder (VC), and may include an internal data modem (DM). Further, the processor 308 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station 10 may also comprise means such as a user interface including, for example, a conventional earphone or speaker 310, a ringer, a microphone 314, a display 316, all of which are coupled to the processor 308. The user input interface, which allows the mobile device to receive data, can comprise any of a number of devices allowing the mobile device to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 320, a removable user identity module (R-UIM) (not shown), or the like, which may store information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, in one embodiment of the present invention, the memory may store computer program code for determining a geographic location associated with the mobile station.

Figure 2:
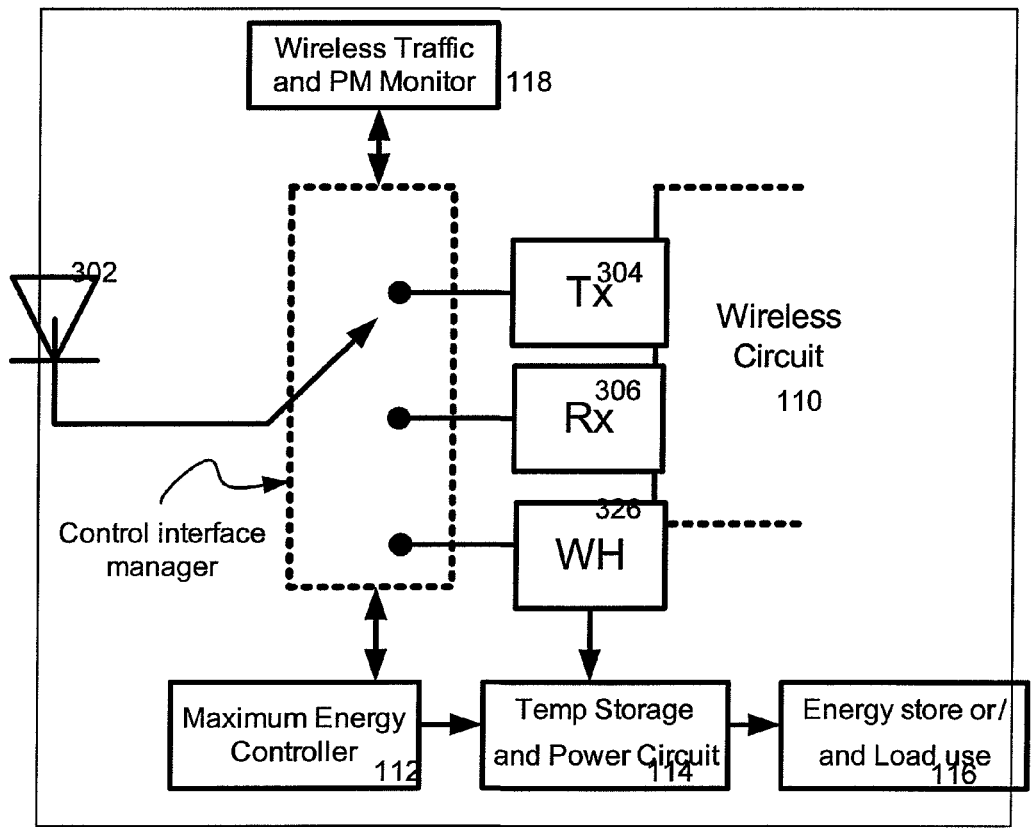
FIG. 2 illustrates a block diagram of a wireless device using an embodiment of a triceiver system with a single antenna.

FIG. 2 illustrates a block diagram of an embodiment of the invention. In one embodiment, the same antenna 302 used in a mobile platform with wireless connectivity can also be used to harvest energy by adding another mode to the multiplexing function. In one mode, the antenna 302 transmits data (TX mode) 304, in another mode, the antenna 302 receives data (RX mode) 306, and in a third mode the antenna is used to harvest wireless energy (WH mode) 326 or to transmit wireless energy. In the WH mode, the wireless energy can be converted into electrical energy and stored in a storage medium. In another embodiment, the harvested energy (or a portion of it) can be used by the wireless device 10 as desired to minimize power consumption or power conversion losses.

In one embodiment of the methods and systems, the amount of energy harvested varies depending on a plurality of factors. For non-limiting examples, the location, proximity to the wireless source, and/or harvesting system design including the power circuit efficiency, controller algorithm, and antenna are some factors in the amount of energy harvested. Energy harvested can be used in extending the duration of stand-by mode and/or other modes of the mobile platform. In another embodiment, the user can increase the amount of harvested energy for example by bringing the device in closer proximity to a source of energy such as, for example, a wireless access point.

Figure 3:
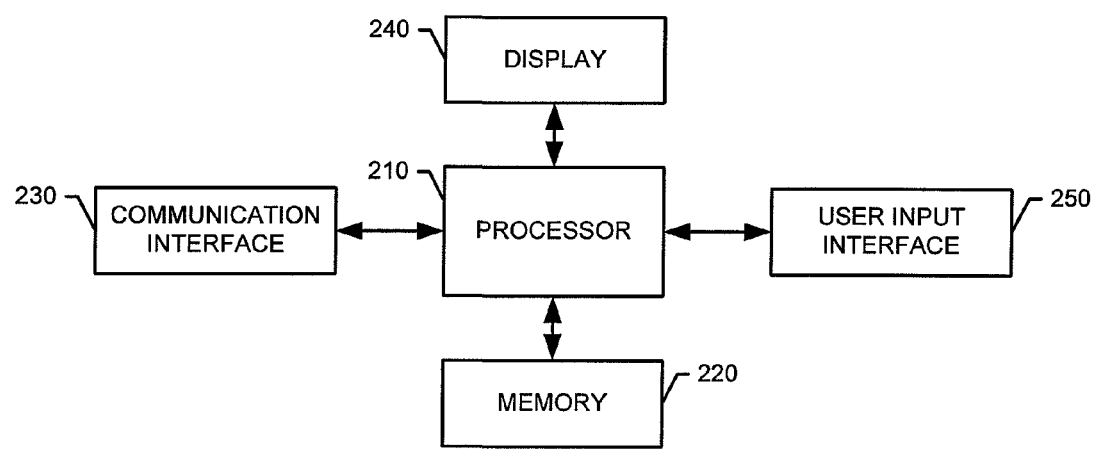
FIG. 3 illustrates a block diagram of an entity capable of operating as a mobile station in accordance with one embodiment of the present invention.

Referring now to FIG. 3, a block diagram of an entity capable of operating as a mobile station 10 is shown in accordance with one embodiment of the present invention. The entity capable of operating as a mobile station 10 includes various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as a mobile station 10 can generally include means, such as a processor 210 for performing or controlling the various functions of the entity.

In particular, the processor 210 may be configured to perform the processes discussed in regard to FIG. 2 and in more detail below with regard to FIGS. 4 and 5. For example, according to one embodiment the processor 210 may be configured to harvest wireless energy (WH mode) or to transmit wireless energy.

In one embodiment, the processor 210 is in communication with or includes memory 220, such as volatile and/or non-volatile memory that stores content, data or the like. For example, the memory 220 may store content transmitted from, and/or received by, the entity. Also for example, the memory 220 may store software applications, instructions or the like for the processor to perform steps associated with operation of the entity in accordance with embodiments of the present invention. In particular, the memory 220 may store software applications, instructions or the like for the processor to perform the operations described herein for harvesting wireless energy (WH mode) or transmitting wireless energy.

For example, according to one embodiment, the memory 220 may store one or more modules for instructing the processor 210 to perform the operations including, for example, an energy control module 112, a power and wireless traffic control module 118, and a wireless harvesting control module, among others. In one embodiment, the wireless harvesting control module can be configured to place the mobile wireless device 10 in an energy receive or an energy transmit mode based upon user selection or specified conditions as described herein.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data from a user, such as a keypad, a touch display, a joystick or other input device.

Figure 4:
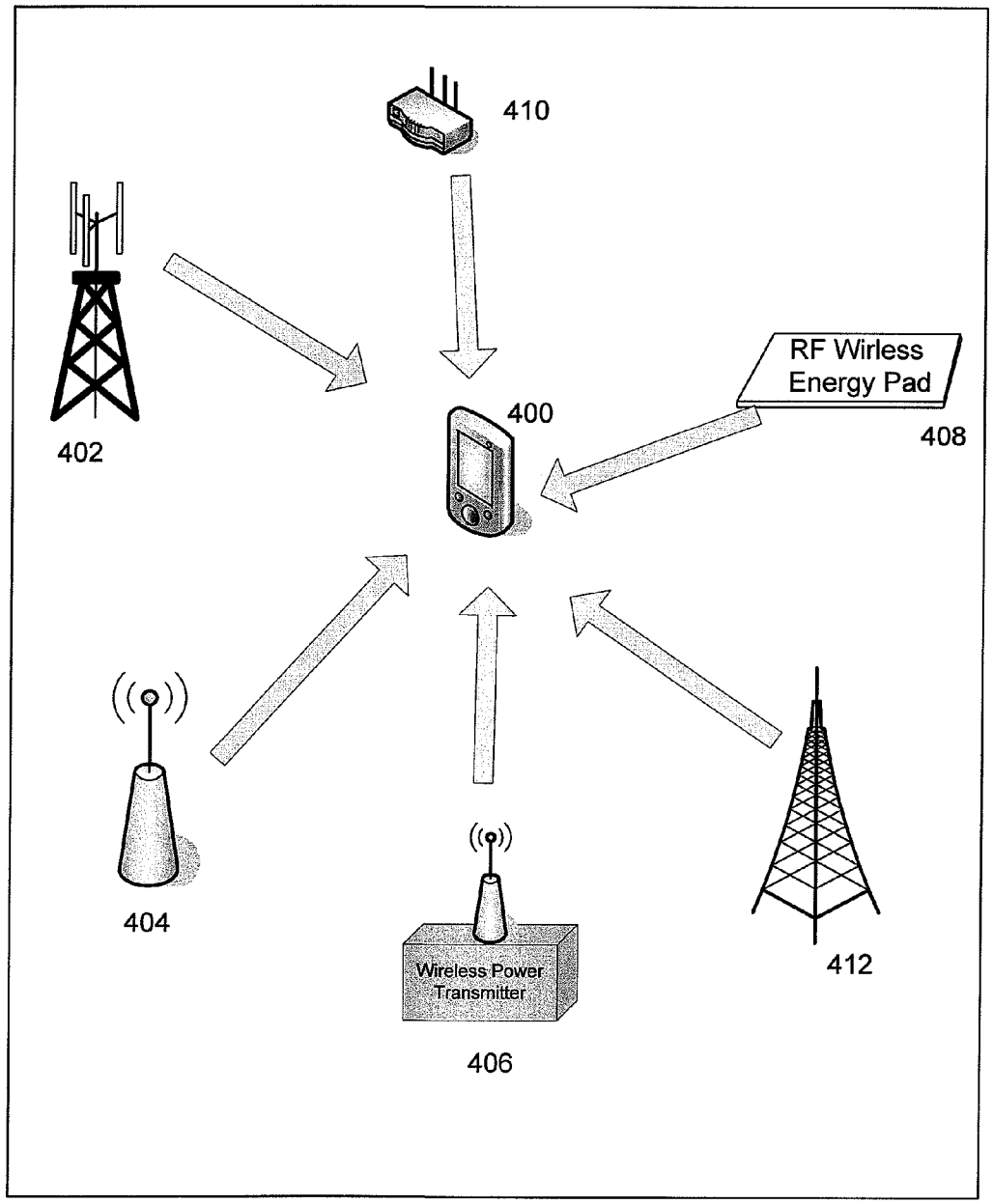
FIG. 4 illustrates a simplified, non-limiting example of a typical wireless environment.

FIG. 4 is a non-limiting overview diagram of a wireless mobile phone device 400 with a triceiver system comprising TX, RX and WH modes using a single antenna for harvesting energy from multiple sources. For example, energy can be harvested from one or more of ambient wireless signals energy available in the atmosphere from wireless towers 402, 412; wireless signals energy from the locally installed wireless repeaters/amplifiers 404; wireless power transmitters 406; an "RF Wireless Charging Pad," 408 which uses RF signals instead of traditional magnetic energy induction to charge devices; a wireless access point 410, or even other wireless mobile devices 400, among other sources of wireless energy. Energy can be harvested from one source or simultaneously from a plurality of sources. Furthermore, received RF signals can be of various frequencies and power levels.

In yet another embodiment, when a wireless mobile device 400 is equipped with an embodiment of a triceiver system, the wireless mobile device 400 can be used in an emergency charging mode (ECM). For a non-limiting example, when a person carrying a mobile device 400 equipped with the proposed triceiver system is lost, as part of an attempt to locate the person, other parties can transmit RF power signals to an area where the lost person is believed to be in. If the person's mobile device 400 has ran out of charged power, the transmitted RF power signals can re-charge the person's mobile device, giving the person an opportunity to contact authorities or have their location determined through various methods such as triangulation or Global Positioning System (GPS) technology. In one embodiment, the ECM operation can be user selected. In other embodiments, the ECM operation can depend on the battery charge or other environmental factors.

In another embodiment, two or more users carrying wireless devices equipped with an embodiment of the triceiver system can provide charge borrowing. With the charge borrowing mode (CBM), users can exchange energy between their respective mobile devices. For a non-limiting example, when a first user's mobile device battery has little or no charge, the first person can borrow charge from a second user's mobile device battery by utilizing the triceiver system. When both devices are equipped with the triceiver system, the second person can select the CBM service on the device to charge the first person's mobile device. FIG. 5 is a non-limiting example showing a modification of FIG. 2 block diagram to include the CBM block 120.

The WH mode circuit comprises power processing circuitries and controls to handle the energy received or transmitted. The power circuitries may include a plurality of capacitors for initial storage, power converter, and/or power controller. Power converters can include buck type (isolated and non-isolated), boost type (isolated and non-isolated), buck-boost type (isolated and non-isolated), cuk type (isolated and non-isolated) to name but a few examples of power converters. Additionally, the power that can be harvested from the system depends on a plurality of factors including but not limited to the distance between the transmitting and harvesting devices, the frequency of the signal used, and the gain of each antenna.

Referring again to FIG. 5 which is a simplified non-limiting block diagram of the triceiver system including a power converter circuit 108 for receiving the harvested energy, regulating the energy and storing it either in a temporary storage device 114 such as a capacitor and/or store it in a battery 116 for later use. This power converter 108 can be of any known conventional power converter topologies such as boost converter, among many others as are known to one of ordinary skill in the art, or it can be a newly created power converter topology.

Figure 5:
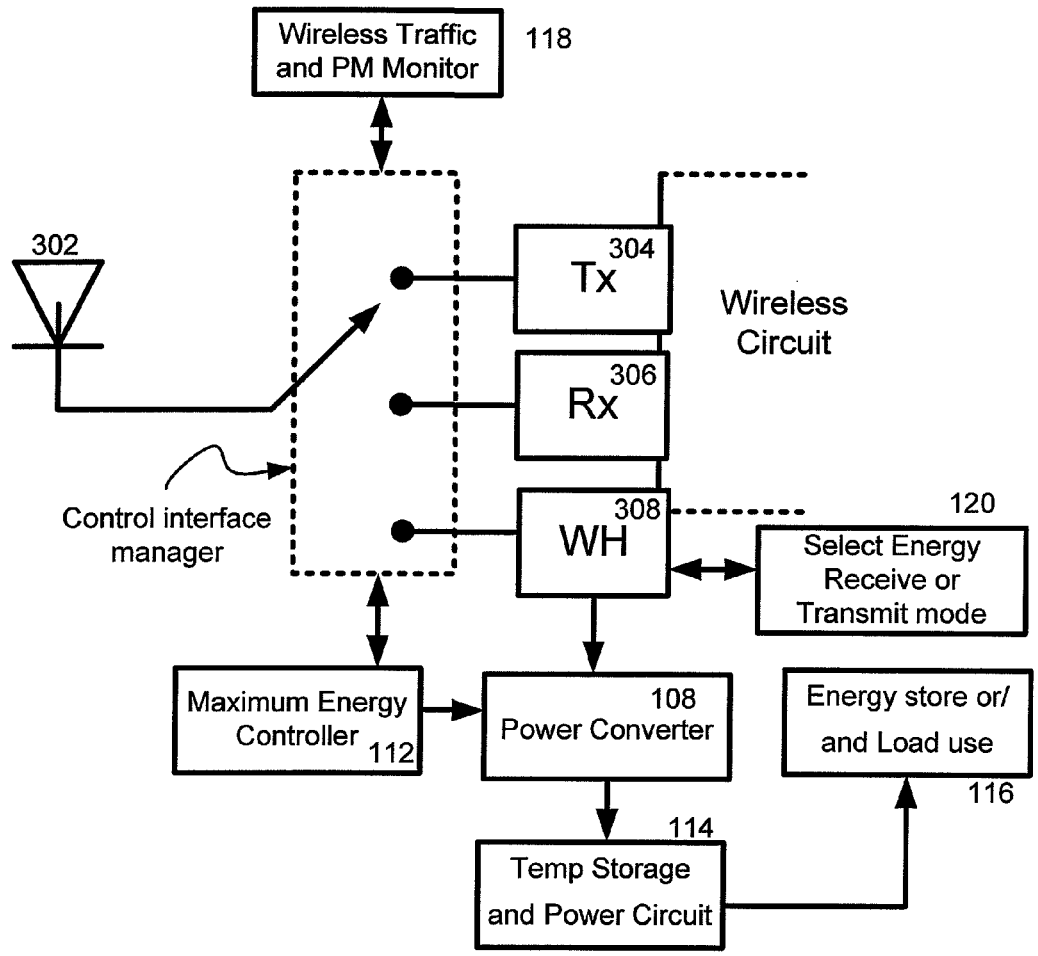
FIG. 5 illustrates a simplified, non-limiting example of a wireless device using a triceiver system with the single antenna for receiving and transmitting electrical power via RF wireless signals.

In one embodiment, as illustrated on FIG. 5, the power converter 108 can be controlled by a power controller 112 to maximize the harvested energy through voltage and current regulation of the power converter 108. The power controller 112 can adjust the power converter operation to match impedance with the antenna to control the amount of energy transferred during WH mode. Additionally, the voltage and/or current of the power converter 108 can be adjusted by the power controller 112 until the maximum energy/power harvesting is reached under a given energy availability condition. This adjustment can be done manually or through an automated process. For a simplified non-limiting example, the triceiver system can receive power within wide range (ex. micro-watts to several watts). The power converter 108 can include an adaptive controller for adjusting the power converter operation and circuit to yield maximum power conversion efficiency for a given power level or other operating conditions.

In another embodiment, the three main operation modes of the triceiver (WH, RX, and TX) 308, 306, 304 are controlled by a power and wireless traffic controller (PWTC) 118. Generally, the power and wireless traffic controller is configured to switch the triceiver antenna to transmit data; switch the triceiver antenna to receive data; and switch the triceiver antenna to power interface mode. The PWTC 118 switches to WH mode to harvest energy (or lend energy) as described herein, under certain specified conditions, such as when there is little or no wireless traffic condition. It switches to RX and/or TX mode to receive and/or transmit data/voice/video when there is high traffic. The PWTC 118, as referenced in FIG. 5 adjusts the duty cycle of how much time the triceiver is in WH mode or RX and TX modes. For a non-limiting example, the duty cycle and data periods can be determined by:

$$\text{Mode Duty Cycle } (MDC) = WH \text{ time/Total Time Period}$$

$$RX\_TX \text{ time} = \text{Total Time Period} - WH \text{ time}$$

Where MDC is represents how much time the triceiver operates in the WH mode relative to a period of operation that includes the three operation modes. WH time is the time the triceiver is in WH mode. Additionally, Total Time Period is equal to the sum of WH Time and RX_TX Time, and RX_TX Time is the amount of time the triceiver is in the RX_TX mode (RX mode and TX mode).

In one embodiment, Total Time Period, WH time and RX_TX time are parameters that either can be selected or varied based on operating conditions such as the wireless data/voice/video traffic magnitude, the available energy magnitude that can be harvested, and the amount of energy left in the device's battery. For a non-limiting simplified example, the WH mode can be given more priority/longer time if battery charge is too low and the available energy for harvesting is high. Alternatively, if the data traffic is high and the energy available to harvest is low, the RX-TX mode can be given more time.

In yet another embodiment, while in CBM operation, the select energy receive or transmit mode, selects energy receive or transmit action based on the user request or permission (based on the other device request) to send charge to another device.

In one embodiment, the triceiver system with the single antenna can be fixed. In another embodiment, the triceiver antenna can have an adaptive or reconfigurable configuration in each operation mode. The triceiver can operate at the same frequency in all modes or it can operate at different frequencies. For a non-limiting simplified example, the Triceiver can operate at different frequency in the WH mode from the operation frequency at the RX_TX modes.

WH mode can utilize a plurality of frequencies based on the mobile device technology. For example, the operational frequencies can be 900 MHz, 1900 MHz, 2.4 GHz or can be lower or higher frequencies depending on the mobile device technology.

In another embodiment, the triceiver WH mode can have an adaptive RF frequency scanning functionality to find the frequency that can generate the desired amount of RF energy harvested. This functionality can be also utilized in the CBM operation in order to maximize the energy efficiency for different distances between the devices.

In yet another embodiment, when activating the CBM function to charge one device from another with the triceiver, an energy indicator can be utilized to show the energy transferred between the devices as the users vary the distance between them and the as they vary the position of the devices from each other. This energy can be measured in the WH and at the power converter circuitry. In another embodiment, one indicator can be used to indicate the energy received by the charge borrower device and another indicator can be used to indicate the energy transmitted or used by the lending device.

While generally described in cooperation with mobile wireless devices such as mobile telephones, the system, method, server, electronic device and computer program product of embodiments of the present invention can be utilized in conjunction with a variety of other applications, both in the mobile communications industries and outside of the mobile communications industries. For example, the system, method, mobile station and computer program product of embodiments of the present invention can be utilized in conjunction with wireline and/or wireless network (e.g., Internet) applications and other devices including stationary wireless devices and stationary non-wireless devices to supplant or supplement power sources for these devices.

Methods

Figure 6:
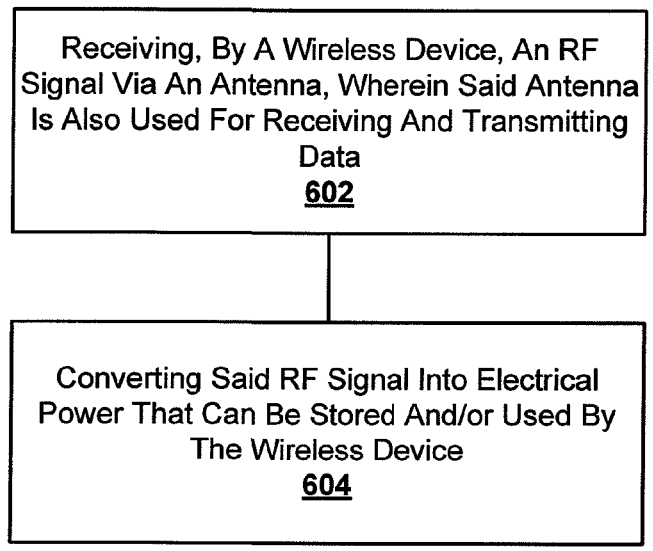
FIG. 6 illustrates a flowchart for practicing one aspect according to an embodiment of the invention.

FIG. 6 illustrates a flowchart for practicing one aspect according to an embodiment of the invention. At step 602, a wireless device receives an RF signal at its antenna. The RF signal can be comprised of one or more RF signals of varying frequencies and/or power levels. The same antenna is also used by the wireless device for receiving and/or transmitting data. At step 604, the RF signal is converted into electrical energy (i.e., power) that can either be used by the wireless device for its operation and/or stored by the wireless device for future usage.

Figure 7:
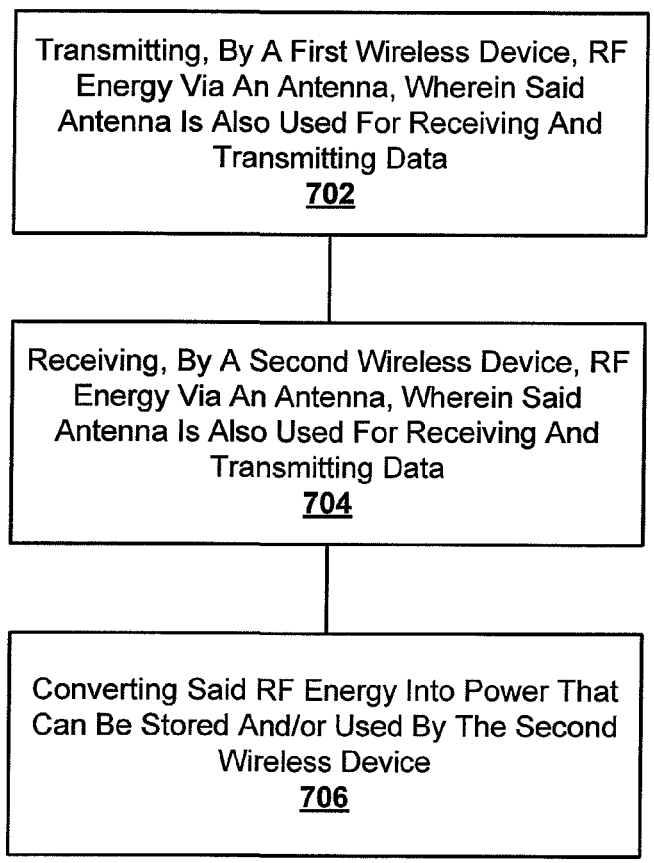
FIG. 7 illustrates a flowchart for practicing another aspect according to an embodiment of the invention.

FIG. 7 illustrates a flowchart for practicing another aspect according to an embodiment of the invention. At step 702, a first wireless device transmits an RF signal via its antenna. The RF signal can be comprised of one or more RF signals of varying frequencies and/or power levels. The same antenna is also used by the wireless device for receiving and/or transmitting data. At step 704, a second wireless device receives the RF signal at its antenna. At step 706, the received RF signal is converted into electrical energy (i.e., power) that can either be used by the second wireless device for its operation and/or stored by the second wireless device for future usage.

Figure 8:
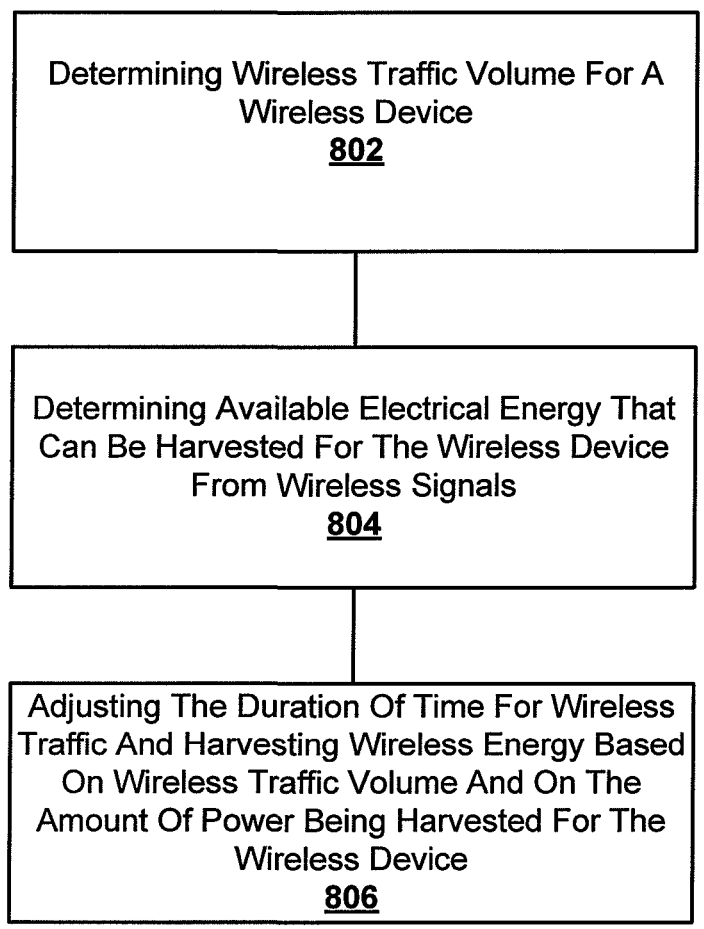
FIG. 8 illustrates a flowchart for controlling a device that can receive and/or transmit data and also harvest energy from an RF signal according to an embodiment of the invention.

FIG. 8 illustrates a flowchart for controlling a device that can receive and/or transmit data and also harvest energy from an RF signal according to an embodiment of the invention. At step 802, wireless traffic volume is determined for a wireless device. This can be considered the time that the wireless device is either receiving or transmitting data. At step 804, available electrical energy is determined that can be harvested for the wireless device from wireless signals. At step 806, the duration of time for wireless traffic and harvesting wireless energy based on wireless traffic volume and on the amount of power being harvested for the wireless device is adjusted based on the determinations.

While the methods and systems have been described in connection with embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as examples only, with a true scope and spirit being indicated by the following inventive concepts.

What is claimed is:

1. An energy harvesting and transmission management system for a mobile device comprised of:
   a triceiver system with a single antenna of the mobile device;
   an RF wireless energy to electrical energy converter operably connected to the triceiver antenna; and
   a power and wireless traffic controller operably connected to the triceiver antenna; wherein the power and wireless traffic controller is configured to:
      switch the triceiver antenna of the mobile device to transmit data;
      switch the triceiver antenna of the mobile device to receive data; and
      switch the triceiver antenna of the mobile device between power interface modes comprising transmitting power to other wireless devices through a plurality of RF wireless signals and receiving power from other wireless devices through a plurality of RF wireless signals.

2. The system of claim 1, wherein receiving a plurality of RF wireless signals from other devices further comprises converting the RF wireless signals into electrical energy.

3. The system of claim 1, wherein the triceiver system with the single antenna comprises:
   a mode for receiving wireless data;
   a mode for transmitting wireless data;
   a mode for receiving RF wireless transmissions, wherein said RF wireless transmissions are converted to electrical energy; and
   a mode for distributing electrical energy through RF wireless transmissions.

4. A method for harvesting RF wireless energy with a mobile device comprising:

using a triceiver system with a single antenna of the mobile device for transmitting data;
using the triceiver system with the single antenna of the mobile device for receiving data;
using the triceiver system with the single antenna of the mobile device for distributing electrical energy through RF wireless transmissions;
using the triceiver system with the single antenna of the mobile device for receiving electrical energy through RF wireless transmissions; and
converting the received RF wireless transmissions into the electrical energy.

5. The method of claim 4, wherein distributing electrical energy through RF wireless transmissions comprises:
transmitting RF wireless signals to one or more other devices, wherein said wireless signals have one or more frequencies.

6. The method of claim 4, wherein using the triceiver system with the single antenna for receiving RF wireless transmissions further comprises converting the RF wireless signals to the electrical energy.

7. The method of claim 6, wherein the electrical energy is stored or used by a device receiving the RF wireless transmission.

8. A method for charging a wireless mobile device comprising:
using a triceiver system with a single antenna of the wireless mobile device to transmit data;
using the triceiver system with the single antenna of the wireless mobile device to receive data;
using the triceiver system with the single antenna of the wireless mobile device to receive power through a plurality of RF wireless signals; and
using the triceiver system with the single antenna of the wireless mobile device to transmit power through a plurality of RF wireless signals at different power levels, wherein a wireless device receiving the RF wireless signals converts the RF wireless signals to electrical energy.

9. The method of claim 8, wherein using the triceiver system with the single antenna to transmit the RF wireless signals comprises transmitting RF wireless signals at different frequencies.

10. A method for charging wireless devices comprising:
setting a first wireless device to receive power through a triceiver system with a single antenna of the first wireless device, the first wireless device being able to receive power and transmit power through the triceiver system, the first wireless device being able to receive data and transmit data through the triceiver system; and
setting a second wireless device to transmit power through a triceiver system with a single antenna of the second wireless device, the second wireless device being able to receive power and transmit power through the triceiver system, the second wireless device being able to receive data and transmit data through the triceiver system; and
transmitting an RF signal from the second wireless device to the first wireless device, wherein the first device converts the RF signal to electrical energy for use by the first device, wherein the first and second wireless devices are mobile wireless devices.

11. The method of claim 10, wherein setting a first wireless device to receive power through a triceiver system is user selected.

12. The method of claim 10, wherein setting a first wireless device to receive power through a triceiver system is automatic depending upon battery charge of the first device.

13. The method of claim 12, wherein setting a first wireless device to receive power through a triceiver system occurs when the first device is inoperable because a battery of the first device is depleted and said first device receives an RF signal from the second device such that said RF signal enables the first device to operate.

14. A method for controlling power and wireless traffic in a mobile device comprising:
controlling a duration of time for harvesting and receiving wireless energy using a triceiver system with a single antenna of the mobile device;
controlling a duration of time for wireless data traffic using the triceiver system with the single antenna of the mobile device;
adjusting the duration of time for wireless data traffic and the duration of time for harvesting and receiving wireless energy based on wireless traffic volume using the triceiver system with the single antenna of the mobile device; and
adjusting the duration of time for wireless data traffic and the duration of time for harvesting and receiving wireless energy based on the amount of power being harvested using the triceiver system with the single antenna of the mobile device.

15. The method of claim 14, wherein power and wireless traffic is controlled over a total time period, further comprising setting a mode duty cycle (MDC), wherein MDC=WH time/Total Time Period, and WH time is the duration of time for harvesting wireless energy.

16. The method of claim 14, wherein power and wireless traffic is controlled over a total time period, further comprising setting a RX_TX time, wherein RX-TX time=Total Time Period−WH time, and WH time is the duration of time for harvesting wireless energy.

17. A computer-readable medium comprising computer-executable code sections which, when executed by a processor, perform a method comprising:
switching a single antenna of a triceiver system associated with a mobile wireless device between a data transmit, data receive, and power interface mode, wherein said power interface mode is comprised of an energy receive mode and an energy transmit mode;
receiving an RF signal via said single antenna while in said energy receive mode of said power interface mode and converting said RF signal into electrical energy for use by said mobile wireless device; and
converting electrical energy into an RF signal and transmitting the RF signal via said single antenna while in said energy transmit mode of said power interface mode, wherein said RF signal can be converted into electrical energy by another device.

18. A computer-readable medium comprising computer-executable code which, when executed by a processor, performs a method for controlling power and wireless traffic of a wireless mobile device and comprising:
controlling a duration of time for harvesting and receiving wireless energy using a triceiver system with a single antenna of the wireless mobile device;
controlling a duration of time for wireless data traffic using the triceiver system with the single antenna of the wireless mobile device;
adjusting the duration of time for wireless data traffic and the duration for time for harvesting and receiving wireless energy based on wireless data traffic volume using the triceiver system with the single antenna of the wireless mobile device; and adjusting the duration of time for wireless data traffic and the duration of time for harvesting and receiving wireless energy based on the amount of power being harvested using the triceiver system with the single antenna of the wireless mobile device.

19. The system of claim 1, wherein the triceiver antenna is configured to operate at a same frequency when transmitting or receiving data and when transmitting or receiving electrical energy.

20. The system of claim 1, wherein the triceiver antenna is configured to operate at different frequencies when transmitting or receiving data and when transmitting or receiving electrical energy.

\* \* \* \* \*